(12) United States Patent
Ishiyama

(10) Patent No.: US 8,425,975 B2
(45) Date of Patent: Apr. 23, 2013

(54) MAGNETIC DISK AND MAGNETIC DISK MANUFACTURING METHOD

(75) Inventor: Masafumi Ishiyama, Singapore (SG)

(73) Assignee: WD Media (Singapore) Pte. Ltd., Singapore (SG)

( * ) Notice: Subject to any disclaimer, the term of this patent is extended or adjusted under 35 U.S.C. 154(b) by 346 days.

(21) Appl. No.: 12/666,555

(22) PCT Filed: Sep. 19, 2008

(86) PCT No.: PCT/JP2008/066964
§ 371 (c)(1),
(2), (4) Date: Mar. 17, 2010

(87) PCT Pub. No.: WO2009/038165
PCT Pub. Date: Mar. 26, 2009

(65) Prior Publication Data
US 2010/0323221 A1  Dec. 23, 2010

(30) Foreign Application Priority Data
Sep. 21, 2007 (JP) ................. 2007-244790

(51) Int. Cl.
*B05D 5/12* (2006.01)
*C23C 8/00* (2006.01)

(52) U.S. Cl.
USPC ............ 427/127; 427/131; 427/585; 427/590

(58) Field of Classification Search .................. None
See application file for complete search history.

(56) References Cited

U.S. PATENT DOCUMENTS

| | | | |
|---|---|---|---|
| 5,776,602 A | 7/1998 | Ueda et al. | |
| 6,468,602 B2 * | 10/2002 | Sakaguchi et al. | 427/570 |
| 6,613,422 B1 * | 9/2003 | Ma et al. | 428/336 |
| 2001/0029051 A1 | 10/2001 | Hyodo et al. | |
| 2003/0211363 A1 | 11/2003 | Morikawa et al. | |
| 2005/0181240 A1 * | 8/2005 | Ishiyama et al. | 428/835.2 |
| 2009/0169922 A1 | 7/2009 | Ishiyama | |

FOREIGN PATENT DOCUMENTS

| | | |
|---|---|---|
| JP | 8-124149 A | 5/1996 |
| JP | 2002-032907 A | 1/2002 |
| JP | 2003-248917 A | 9/2003 |
| JP | 2005-149553 A | 6/2005 |
| JP | 2007-257756 A | 10/2007 |
| JP | 2008-276912 A | 11/2008 |
| WO | 99/14746 A1 | 3/1999 |

* cited by examiner

*Primary Examiner* — Holly Rickman

(57) ABSTRACT

Provided is a magnetic disk (10) for a magnetic recording, which comprises a magnetic layer (4) for a magnetic recording, a protecting layer (5) formed over the magnetic layer (4) for protecting the magnetic layer (4), and a lubricating layer (6) formed over the protecting layer (5). The protecting layer (5) is a layer composed substantially of carbon, hydrogen and nitrogen. The atomic ratio (N/C) of nitrogen and carbon, which was calculated from the spectral intensities of N1s and C1s detected for a detection angle of 7 degrees of photoelectrons by an angularly resolved X-ray photoelectron spectroscopy, is 0.15 to 0.25. This constitution of the protecting layer (5) is excellent in wear resistance and sliding characteristics even for a film thickness of 3 nm or less and provides a magnetic disk which can avoid a high fly write trouble or the like.

6 Claims, 3 Drawing Sheets

MAGNETIC DISK AND MAGNETIC DISK MANUFACTURING METHOD

CROSS REFERENCE TO RELATED APPLICATION

This application is a National Stage of International Application No. PCT/JP2008/066964, filed Sep. 19, 2008, which claims priority from Japanese Patent Application No. 2007-244790, filed Sep. 21, 2007, the contents of all of which are incorporated herein by reference in their entirety

TECHNICAL FIELD

This invention relates to a magnetic disk for use in a magnetic disk apparatus such as a HDD (hard disk drive) and a method of manufacturing the magnetic disk.

BACKGROUND ART

Nowadays, the information recording technique, particularly the magnetic recording technique, requires a significant technological innovation following the development of the IT industry. For magnetic disks adapted to be mounted in magnetic disk apparatuses such as HDDs (hard disk drives), there is required a technique capable of achieving an information recording density of 100 Gbit/inch$^2$ or more. Hitherto, in a magnetic disk, a magnetic layer adapted to record information is provided on a substrate and, on the magnetic layer, there are provided a protective layer for protecting the magnetic layer and a lubricating layer for reducing interference from a flying magnetic head. Further, in recent years, as a HDD start/stop mechanism, it has been required to use, instead of the conventional CSS (contact start/stop) system, the LUL system (load/unload system, also called the ramp load system) capable of increasing the capacity.

Patent Document 1: International Publication No. 99/014746 Pamphlet

DISCLOSURE OF THE INVENTION

Problem to be Solved by the Invention

In the demand for the increase in recording density in recent years, various approaches have been attempted for achieving the information recording density of 100 Gbit/inch$^2$ or more. As one of them, it is required to reduce the distance (magnetic spacing) between a magnetic layer of a magnetic disk and a recording/reproducing element of a magnetic head to 20 nm or less for improving the spacing loss to improve the S/N ratio. In terms of achieving this magnetic spacing, it is required to reduce the thickness of a protective layer of the magnetic disk to 3 nm or less.

Further, in recent years, as one technique for reducing the magnetic spacing, there is considered a method of heating a heating element during operation of a recording/reproducing element of a magnetic head. In this method, the magnetic head is thermally expanded by the heat of the heating element provided in the magnetic head and slightly projects in an ABS direction (air bearing surface direction). By this, the magnetic spacing between the recording/reproducing element and a surface of a magnetic disk can be reduced only in that event. Such a magnetic head is called a DFH (dynamic flying height) head.

However, in the case of using such a DFH head, since the flying height of the recording/reproducing element portion changes, there is a possibility of the occurrence of a problem that when the magnetic head most approaches the outermost surface of the magnetic disk, intermittent contact occurs between the magnetic head and the magnetic disk so that the flying is not stabilized. Further, as a result thereof, there is a possibility of making dirty the recording/reproducing element portion of the magnetic head so that there occurs a serious problem called a high fly write in which recording/reproduction is disabled.

For ensuring the wear resistance and sliding properties of a thin film to be formed on a magnetic disk, there has heretofore been proposed a method of forming a protective layer by a plasma CVD method (see, e.g. Patent Document 1). However, with the protective layer obtained by this technique, there is a possibility that sufficient sliding durability (durability/reliability) cannot be obtained in a thin film region in which the thickness is less than 3 nm.

This invention has been made in view of the above-mentioned problems. It is an object of this invention to provide a magnetic disk (particularly a perpendicular magnetic disk) suitable for the wear resistance and sliding properties, for example, even with a thickness of 3 nm or less of a protective layer. Further, it is an object to provide, by this, a magnetic disk applicable to, for example, a DFH head.

Means for Solving the Problem

As a result of an intensive study, the present inventor has found that the nitrogen content relative to the carbon content (N/C) at an outermost surface of a protective layer is important for ensuring excellent durability/reliability even with a small film thickness of 3 nm or less. Then, for example, since it is considered that the high fly write problem or the like caused by the flying instability of a magnetic head occurs at the interface between a surface of the magnetic head and an outermost surface of a magnetic disk medium, the present inventor has found that the high fly write problem or the like can be solved by optimizing the nitrogen content at the outermost surface of the protective layer forming the outermost surface of the magnetic disk medium.

Further, in order to ensure the optimum nitrogen content at the outermost surface as described above, the present inventor has paid attention to the degree of vacuum during formation of the protective layer. Then, the present inventor has found that, for example, by forming a hydrocarbon-based protective film directly on a magnetic layer at a low-pressure vacuum degree (0.1 Pa or more and 2 Pa or less) and forming, at an upper layer thereof, a surface layer portion being a surface-treated layer made of carbon and nitrogen at a high-pressure vacuum degree (2 Pa or more and 6 Pa or less), the surface layer portion subjected to a surface treatment with nitrogen can be formed only at an outermost surface of the protective layer. This invention, which has been completed based on this knowledge, has the following configurations.

(Structure 1)

Provided is a magnetic disk for magnetic recording. The magnetic disk is characterized by comprising a magnetic layer for magnetic recording, a protective layer formed over the magnetic layer for protecting the magnetic layer, and a lubricating layer formed over the protective layer. The protective layer is a layer composed substantially of carbon, hydrogen, and nitrogen and an atomic ratio (N/C) of nitrogen and carbon (the ratio of the number of nitrogen atoms to the number of carbon atoms) calculated from intensities of N1s and C1s spectra detected at a photoelectron detection angle of 7° by angularly resolved X-ray photoelectron spectroscopy is 0.15 or more and 0.25 or less. The X-ray photoelectron spectroscopy is, for example, ESCA (Electron Spectroscopy for Chemical Analysis). "composed substantially of carbon, hydrogen, and nitrogen" means not intentionally containing another substance except impurities or the like in an allowable range, for example.

With this configuration, even if, for example, the thickness of the protective layer is set to 3 nm or less, excellent durability/reliability can be ensured. Thus, the high fly write problem or the like can be properly solved. By this, it is possible to properly provide a magnetic disk applicable to, for example, a DFH head.

Herein, the atomic ratio (N/C) obtained by the X-ray photoelectron spectroscopy is, for example, an atomic ratio (N/C) of nitrogen and carbon at an outermost surface of the protective layer. If the atomic ratio (N/C) is less than 0.15, there is a possibility of degradation in adhesion to the lubricating layer. On the other hand, if the atomic ratio (N/C) exceeds 0.25, there is a possibility of reduction in hardness of the protective layer.

This magnetic disk is, for example, a perpendicular magnetic disk for magnetic recording of the perpendicular magnetic recording type. In this case, the magnetic disk further comprises, for example, a nonmagnetic substrate, a soft magnetic layer, a nonmagnetic underlayer, and so on. The soft magnetic layer, the underlayer, the magnetic layer, the protective layer, and the lubricating layer are formed in this order on the substrate, for example.

It is preferable to use a glass substrate as the substrate. Since the glass substrate can obtain smoothness and high rigidity, it can more stably reduce the magnetic spacing, especially the flying height of a magnetic head and thus is particularly preferable. As a material of the glass substrate, aluminosilicate glass is particularly preferable. The aluminosilicate glass can obtain high rigidity and strength by chemical strengthening. The surface roughness of a surface of the magnetic disk is preferably 4 nm or less in Rmax. If it exceeds 4 nm, there is a case where the reduction in magnetic spacing is impeded, which is thus not preferable. The surface roughness referred to herein is determined by the Japanese Industrial Standard (JIS) B0601:1982.

The thickness of the protective layer is preferably 1 nm or more. If less than 1 nm, there is a case where the coverage of the protective layer decreases to be insufficient for preventing migration of metal ions of the magnetic layer. Further, the protective layer with a thickness of less than 1 nm has a problem in wear resistance. It is not particularly necessary to provide an upper limit to the thickness of the protective layer, but it is preferably set to 3 nm or less on a practical basis in order not to impede the improvement in magnetic spacing.

The lubricating layer is preferably a layer of a lubricant containing a perfluoropolyether compound having hydroxyl groups as terminal groups. Perfluoropolyether has a straight-chain structure and exhibits lubricating performance suitable for a magnetic disk and, by having hydroxyl groups (OH) as terminal groups, it can exhibit high adhesion performance to the protective layer. Particularly, in this structure in which the protective layer contains nitrogen at its outermost surface, since (N+) and (OH−) have high affinity for each other, it is possible to obtain high lubricating layer adhesion, which is thus preferable. As the perfluoropolyether compound having hydroxyl groups as terminal groups, the number of hydroxyl groups in one molecule is preferably 2 to 4. If the number of hydroxyl groups is less than 2, there is a case where the adhesion of the lubricating layer is reduced, which is thus not preferable. On the other hand, if the number of hydroxyl groups exceeds 4, there is a case where the lubricating performance is lowered as a result of excessive improvement in adhesion. The thickness of the lubricating layer may be properly adjusted in a range of 0.5 nm to 1.5 nm. If the thickness of the lubricating layer is less than 0.5 nm, there is a case where the lubricating performance is lowered, while if it exceeds 1.5 nm, there is a case where the lubricating layer adhesion is reduced.

The protective layer has, for example, a hydrogenated carbon protective film composed substantially of carbon and hydrogen and formed on the magnetic layer and a surface layer portion containing carbon and nitrogen and formed at a surface portion in contact with the lubricating layer. In the formation of the protective layer, the hydrogenated carbon protective film is formed in an atmosphere with a vacuum degree of 0.1 Pa or more and 2 Pa or less and the surface layer portion is formed in an atmosphere with a vacuum degree of 2 Pa or more and 6 Pa or less.

(Structure 2)

Provided is a magnetic disk for an LUL-system HDD. If the sliding durability of the protective layer is not sufficiently obtained, there arises a problem that, for example, in a nowadays LUL-system magnetic disk apparatus, fine scratches or the like are generated on a magnetic disk due to an impact when a magnetic head is loaded on the magnetic disk, so that a reproducing signal is degraded. Further, if, for example, the flying height of the magnetic head is set to 10 nm or less, there is a possibility of the occurrence of a problem that intermittent contact occurs between the magnetic head and the magnetic disk so that the flying is not stabilized, and a serious problem that a recording/reproducing element portion of the magnetic head is made dirty so that recording/reproduction is disabled.

In contrast, by setting the atomic ratio (N/C) of nitrogen and carbon as described above in the protective layer, it is possible to properly enhance the durability/reliability of the magnetic disk. Therefore, it is possible to provide a magnetic disk suitable for the LUL system.

(Structure 3)

Provided is a magnetic disk manufacturing method of manufacturing the magnetic disk according to the structure 1 or 2. The protective layer comprises a hydrogenated carbon protective film composed substantially of carbon and hydrogen and formed over the magnetic layer, and a surface layer portion containing carbon and nitrogen and formed at a surface portion in contact with the lubricating layer. The hydrogenated carbon protective film is formed in an atmosphere with a vacuum degree of 0.1 Pa or more and 2 Pa or less by a plasma CVD method. The surface layer portion is formed in an atmosphere with a vacuum degree of 2 Pa or more and 6 Pa or less by the plasma CVD method. "composed substantially of carbon and hydrogen" means not intentionally containing another substance except impurities or the like in an allowable range (or which are unavoidable), for example. The surface layer portion of the protective layer is formed between the hydrogenated carbon protective film and the lubricating layer. The surface layer portion may be a layer composed substantially of carbon and nitrogen. Adhesion of the surface layer portion to the lubricating layer is greater than that of the hydrogenated carbon protective film, for example.

Hitherto, as a method of forming a protective layer directly on a magnetic layer, there are known a method of forming a hydrogenated carbon protective film by a CVD method using only a hydrocarbon-based gas as a reactive gas (material gas), a method of forming a hydrogenated carbon protective film using a mixed gas of an inert gas such as Ar and a hydrocarbon-based gas, a method of forming a protective layer using a mixed gas of a hydrogen gas and a hydrocarbon-based gas, and so on. In these methods, the pressure (vacuum degree) of the reactive gas is set to 2 to 6 Pa.

However, the present inventor has found a problem that when a very thin protective layer of 3 nm or less is formed by such a method, since the durability/strength of the protective layer itself becomes insufficient, the film strength is extremely reduced. In this case, there arises a problem that, for example, with an LUL-system magnetic disk or the like, fine scratches or the like are generated on the magnetic disk due to an impact when a magnetic head is loaded on the magnetic disk, so that a reproducing signal is degraded.

Further, hitherto, there is a case where, in order to improve the adhesion between a protective layer and a lubricating layer, nitrogen is introduced into the protective layer to enhance the adhesion. However, in this case, since nitrogen penetrates deep into the protective layer, this is one of causes of insufficiency of the durability/strength of the protective layer itself.

In order to avoid this, the present inventor has intensively studied. Then, in order to ensure excellent sliding durability even if the thickness of a protective layer is 3 nm or less, the present inventor has paid attention to the degree of vacuum during formation of the protective layer and the degree of vacuum during formation of a surface layer portion. As a result, the present inventor has found that, by adjusting these degrees of vacuum, it is possible to increase the film strength of the protective layer and to enhance the adhesion between the protective layer and a lubricating layer. For example, the present inventor has found that, by setting the vacuum degree (pressure of a reactive gas) during formation of the protective layer to a vacuum degree of a low pressure (hereinafter referred to as a low-pressure vacuum degree, 0.1 to 2 Pa), it is possible to ensure excellent sliding durability even if the thickness of the protective layer is 3 nm or less. Further, the present inventor has found that, by setting the vacuum degree during formation of the surface layer portion to a vacuum degree of a high pressure (hereinafter referred to as a high-pressure vacuum degree, 2 to 6 Pa), it is possible to form the surface layer portion being a nitrogen surface-treated layer only at an outermost surface of the protective layer. By this, while preventing penetration of nitrogen deep into the protective layer to ensure the durability/strength of the entire protective layer, it is possible to enhance the adhesion between the protective layer and the lubricating layer.

Therefore, according to the Configuration 3, by combining the formation of the hydrogenated carbon protective film at the low-pressure vacuum degree and the formation of the surface-treated layer at the high-pressure vacuum degree, it is possible to properly form the protective layer having both the durability and the adhesion to the lubricating layer. By this, it is possible to provide a magnetic disk excellent in wear resistance and sliding properties even if the thickness of the protective layer is set to 3 nm or less. Therefore, for example, it is possible to properly prevent durability abnormality or the like such as scratches which occur when the protective layer of 3 nm or less is formed by the conventional manufacturing method. Further, it is possible to obtain a magnetic disk that can prevent degradation of a reproducing signal or the like due to a high fly write and has no problem in LUL durability even if the thickness of the protective layer is set to 3 nm or less.

Herein, the reason for forming the hydrogenated carbon protective film at the low-pressure vacuum degree (0.1 to 2 Pa) is as follows. At the low-pressure vacuum degree (0.1 to 2 Pa), the influence of interfering molecules or the like that take the kinetic energy from carbon atoms decomposed by a plasma until the carbon atoms reach a film forming surface, is very small as compared with that at the high-pressure vacuum degree (2 to 6 Pa). That is, the chance of the carbon atoms to collide with the interfering molecules or the like until reaching the substrate is reduced. This means that the carbon atoms can reach the film forming surface while maintaining high energy. In this case, since the hydrogenated carbon protective film is formed by the carbon atoms maintaining this high energy, the dense and durable protective layer can be formed. In this manner, the dense film can be obtained by forming it at the low-pressure vacuum degree (0.1 to 2 Pa).

At a vacuum degree of a pressure less than 0.1 Pa, there is a possibility that the discharge becomes unstable, for example. Further, even if the discharge occurs, the film forming rate becomes extremely small so that there is a problem on a practical basis. Thus, 0.1 Pa or more and 2 Pa or less is preferable.

The reason for forming the surface layer portion at the high-pressure vacuum degree (2 to 6 Pa) is as follows. This surface layer portion is required to have a function of ensuring the adhesion to the lubricating layer formed as its upper layer. Therefore, in order to ensure the adhesion to the lubricating layer, the surface layer portion is formed by introducing nitrogen. However, in general, it is known that when the durability of a hydrocarbon film and the durability of a carbon nitride film are compared with each other, the carbon nitride film is inferior in durability.

Therefore, although the surface layer portion of the carbon nitride film is necessary for ensuring the adhesion to the lubricating layer, if nitrogen is excessively introduced more than required, there arises a problem of degradation in durability. Then, in order to prevent the occurrence of this problem, the surface layer portion subjected to the surface treatment with nitrogen is required to be formed only at the outermost surface of the protective layer.

Therefore, according to a way of thinking contrary to the film forming method of the hydrogenated carbon protective film, the surface layer portion is formed in an atmosphere at the high-pressure vacuum degree (2 to 6 Pa) so as to prevent nitrogen from penetrating into the protective layer more than required. If the surface layer portion is formed at the low-pressure vacuum degree, a large amount of nitrogen is implanted into the hydrogenated carbon protective film so that nitrogen penetrates deep into the protective layer to degrade the durability. Therefore, an atmosphere for forming the surface layer portion is preferably set to the range of the high-pressure vacuum degree (2 to 6 Pa).

(Structure 4)

The hydrogenated carbon protective film is formed by the plasma CVD method using substantially only a straight-chain saturated hydrocarbon based gas as a reactive gas, but not using a carrier gas. "using substantially only a straight-chain saturated hydrocarbon based gas" means not intentionally using another gas except impurities or the like in an allowable range (or which are unavoidable), for example.

When forming the hydrogenated carbon protective film by the plasma CVD method, it is preferable to use only a hydrocarbon gas as a reactive gas to form diamond-like carbon. In the case where another inert gas (e.g. Ar or the like) or a carrier gas such as a hydrogen gas is mixed with a hydrocarbon gas, such an impurity gas is captured into the hydrogenated carbon protective film to lower the film density, which is thus not preferable.

As the reactive gas, it is preferable to use a lower hydrocarbon. Especially, it is preferable to use a straight-chain lower hydrocarbon such as a straight-chain lower saturated hydrocarbon or a straight-chain lower unsaturated hydrocarbon. As the straight-chain lower saturated hydrocarbon, use can be made of methane, ethane, propane, butane, octane, or the like. As the straight-chain lower unsaturated hydrocarbon, use can be made of ethylene, propylene, butylene, acetylene, or the like. The lower hydrocarbon referred to herein represents a hydrocarbon having a carbon number of 1 to 10 per molecule. The reason why it is preferable to use the straight-chain lower hydrocarbon is that as the carbon number increases, it becomes difficult to supply a hydrocarbon to a film forming apparatus as a vaporized gas and, further, it becomes difficult to achieve decomposition thereof during plasma discharge. Further, as the carbon number increases, high-molecular hydrocarbon components tend to be contained in large quantities as components of a formed protective layer so that the density and hardness of the protective layer decrease, which is thus not preferable. Further, in the case of a cyclic hydrocarbon, it is difficult to achieve decomposition thereof during plasma discharge as compared with the straight-chain hydrocarbon, which is thus not preferable. In view of the above, it is particularly preferable to use the straight-chain lower hydrocarbon as a hydrocarbon. Especially, if ethylene is used, it is possible to form a dense and hard protective layer, which is thus particularly preferable.

In the plasma CVD method of forming the hydrogenated carbon protective film, plasma ignition may be carried out in advance using, for example, an igniter. This makes it possible to easily generate and discharge a plasma even at the low-pressure vacuum degree (0.1 to 2 Pa). Further, this makes it possible to form the hydrogenated carbon protective film more stably even at the low-pressure vacuum degree (0.1 to 2 Pa).

The hydrogenated carbon protective film is preferably formed in an atmosphere where the film forming temperature becomes room temperature or higher and 250° C. or less. As a result of a study of the present inventor, it has been found that when the substrate temperature is set to room temperature or higher and 250° C. or less, it is possible to form a dense and hard hydrogenated carbon protective film. It is believed that this is because when the film forming temperature becomes excessively high, carbon atoms arriving at the film forming surface are in a state of being easily movable on the film forming surface so that the carbon atoms diffuse to a surface layer to grow like graphite. That is, the hydrogenated carbon protective film is preferably formed at room temperature or higher and 250° C. or less and further at the low-pressure vacuum degree (0.1 to 2 Pa).

Further, it is preferable to carry out a heat treatment at, for example, 150° C. or more and 250° C. or less immediately after forming the magnetic layer and immediately before forming the hydrogenated carbon protective film. The reason thereof is as follows. If the heat treatment is carried out immediately before forming the hydrogenated carbon protective film, this means that carbon atoms decomposed by a plasma can reach the film forming surface while maintaining high energy. Since the carbon atoms maintaining this high energy are formed into a film on the magnetic layer, the dense and durable protective layer can be formed. Further, by heating the magnetic layer at the high temperature, the adhesion between the magnetic layer and the protective layer is also improved.

Further, the hydrogenated carbon protective film is preferably formed by applying a DC bias of a negative voltage (−50 to −400V) with a magnitude of 50V or more and 400V or less to the substrate. With a negative voltage having a magnitude of less than 50V, the effect of the bias application is not sufficient. On the other hand, if a negative voltage with a magnitude exceeding 400V is applied, arcing occurs due to the application of excessive energy to the substrate to cause particles or contamination, which is thus not preferable.

After forming the protective layer, the substrate formed with the layers up to the surface layer portion is preferably washed with, for example, ultrapure water and isopropyl alcohol. By this, the surface quality of the magnetic disk can be improved.

(Structure 5)

After forming the hydrogenated carbon protective film, the surface layer portion is formed by exposing the hydrogenated carbon protective film to a nitrogen atmosphere to perform a surface treatment of the hydrogenated carbon protective film. By this, the surface layer portion can be properly formed. In this case, after forming the hydrogenated carbon protective film, it is preferable to expose the hydrogenated carbon protective film to a nitrogen atmosphere in which the nitrogen flow rate is 100 sccm or more and 350 sccm or less. By this, it is possible to properly form the protective layer in which the atomic ratio (N/C) of nitrogen and carbon obtained by the X-ray photoelectron spectroscopy takes a value in the above-mentioned range.

(Structure 6)

The surface treatment of the hydrogenated carbon protective film is performed while an RF bias is applied at a power of 1 W or more and 100 W or less. By this, it is possible to properly form the protective layer in which the atomic ratio (N/C) of nitrogen and carbon obtained by the X-ray photoelectron spectroscopy takes a value in the above-mentioned range.

(Structure 7)

Provided is a magnetic disk manufacturing method of manufacturing a magnetic disk comprising a magnetic layer for magnetic recording, a protective layer formed over the magnetic layer for protecting the magnetic layer, and a lubricating layer formed over the protective layer. The protective layer is formed by a protective film forming step of forming, by a plasma CVD method, a hydrogenated carbon protective film composed substantially of carbon and hydrogen over the magnetic layer, and a surface layer portion forming step of forming, by the plasma CVD method, a surface layer portion containing carbon and nitrogen at a surface portion in contact with the lubricating layer. The surface layer portion forming step is performed in an atmosphere with a vacuum degree higher than that of the protective film forming step. By this, for example, it is possible to properly form the hydrogenated carbon protective film and the surface layer portion.

Effect of the Invention

According to this invention, for example, it is possible to provide a magnetic disk excellent in wear resistance and sliding properties even if the thickness of a protective layer is 3 nm or less. Further, for example, it is possible to provide a magnetic disk that can avoid a high fly write failure. Further, for example, it is possible to provide a magnetic disk suitable for the LUL system.

BRIEF DESCRIPTION OF THE DRAWINGS

FIG. 2(a) is diagrams each showing one example of the configuration of an apparatus for carrying out the X-ray photoelectron spectroscopy. FIG. 2(b) is a diagram showing a state where electrons jump out from two points A and B at different depths in a sample.

DESCRIPTION OF SYMBOLS

1 ... substrate, 2 ... soft magnetic layer, 3 ... underlayer, 4 ... magnetic layer, 5 ... protective layer, 5a ... hydrogenated carbon protective film, 5b ... surface layer portion, 6 ... lubricating layer, 10 ... magnetic disk, 21 ... X-ray source, 22 ... photoelectron detector, 23 ... sample, 24 ... X-ray, 25 ... excited region

BEST MODE FOR CARRYING OUT THE INVENTION

Figure 1:
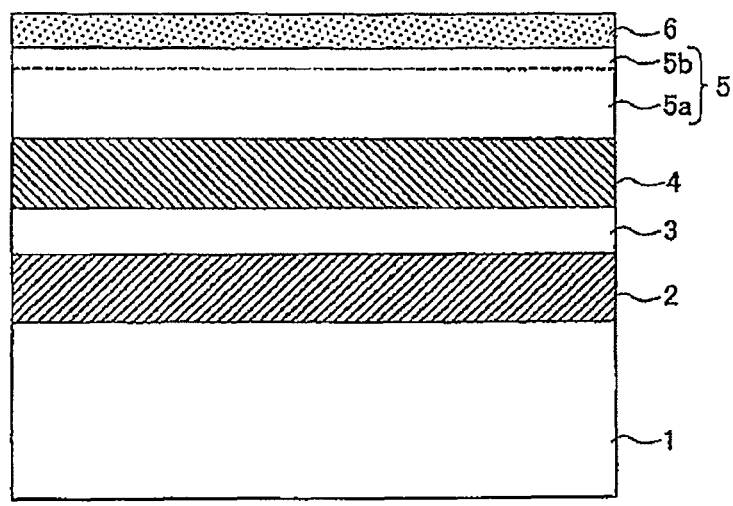
FIG. 1 is a sectional view exemplarily showing a layer structure of a magnetic disk 10 according to an embodiment of this invention.

Hereinbelow, an embodiment according to this invention will be described with reference to the drawings. FIG. 1 is a sectional view exemplarily showing a layer structure of a magnetic disk 10 according to the embodiment of this invention. The magnetic disk 10 is a magnetic recording medium (perpendicular magnetic disk) for magnetic recording of the perpendicular magnetic recording type and comprises at least a substrate 1, a magnetic layer 4 formed over the substrate 1, a protective layer 5 formed on the magnetic layer 4, and a lubricating layer 6 formed on the protective layer 5. In this embodiment, the magnetic disk 10 further comprises, between the substrate 1 and the magnetic layer 4, a soft magnetic layer 2 formed on the substrate 1 and a nonmagnetic underlayer 3 formed on the soft magnetic layer 2.

Further, in this embodiment, the magnetic layer 4 and the protective layer 5 are formed in contact with each other. The protective layer 5 and the lubricating layer 6 are formed in contact with each other. The protective layer 5 comprises a hydrogenated carbon protective film 5a formed on the magnetic layer 4 side and a surface layer portion 5b formed on the lubricating layer 6 side. The hydrogenated carbon protective film 5a is a layer composed substantially of carbon and hydrogen and is formed by plasma CVD in contact with the magnetic layer 4. The surface layer portion 5b is a layer containing nitrogen and formed by a surface treatment of the hydrogenated carbon protective film 5a and is formed in contact with the hydrogenated carbon protective film 5a. The surface layer portion 5b may be a layer composed substantially of carbon and nitrogen.

The magnetic disk 10 described above will be described in further detail with reference to Examples and Comparative Examples. However, this invention is not limited thereto.

Example 1

A magnetic disk of Example 1 and its manufacturing method will be described. First, materials of a substrate 1 being a glass substrate and respective layers and their forming methods will be described in detail. The substrate 1 is an amorphous glass substrate and its composition is an aluminosilicate. The substrate 1 is a 2.5-inch magnetic-disk substrate with a diameter of 65 mm, an inner diameter of 20 mm, and a disk thickness of 0.635 mm. The surface roughness of the obtained glass substrate was observed by an AFM (atomic force microscope) and it was confirmed to be a smooth surface with Rmax of 2.18 nm and Ra of 0.18 nm.

Then, using a C3040 sputtering film forming apparatus manufactured by Canon ANELVA Corporation, a soft magnetic layer 2, an underlayer 3, and a magnetic layer 4 were formed in sequence on the substrate 1 by a DC magnetron sputtering method. Specifically, first, using a CoTaZr (Co:92 at %, Ta:3 at %, Zr:5 at %) alloy as a sputtering target, the soft magnetic layer 2 having a thickness of 50 nm and made of the CoTaZr alloy was formed on the substrate 1 by the sputtering method. The vacuum degree during the film formation was 0.6 Pa. Then, using Pd as a sputtering target, the underlayer 3 of Pd having a thickness of 7 nm was formed on the soft magnetic layer 2 by the sputtering method. The vacuum degree during the film formation was 1.0 Pa. Then, using a CoCrPt—$TiO_2$ (Cr:12 at %, Pt:10 at %, $TiO_2$:9 at %, the balance Co) alloy as a sputtering target, the magnetic layer 4 having a thickness of 15 nm and made of the CoCrPt—$TiO_2$ alloy was formed on the underlayer 3 by the sputtering method. The vacuum degree during the film formation was 3.5 Pa.

The substrate 1 was heated using a heater heating system so that the substrate temperature after forming the magnetic layer 4 became 250° C. The substrate temperature was confirmed using a radiation thermometer through a window of a chamber immediately after the formation of the magnetic layer 4.

Then, an ethylene gas was introduced at 250 sccm into the chamber and, while applying a bias voltage of −300V under a pressure where the vacuum degree was set to 1.6 Pa, a hydrogenated carbon protective film 5a was formed by the plasma CVD method on the disk formed with the layers up to the magnetic layer 4. The film forming rate in the formation of the hydrogenated carbon protective film 5a was 1 nm/s.

Further, after forming the hydrogenated carbon protective film 5a, the vacuum degree was adjusted to 6 Pa while introducing only a nitrogen gas at 250 sccm into a plasma. Then, under this pressure, a surface treatment was carried out by exposing the hydrogenated carbon protective film 5a to a nitrogen atmosphere and applying an RF bias at 100 W, thereby forming a surface layer portion 5b. By this, a protective layer 5 having the hydrogenated carbon protective film 5a and the surface layer portion 5b is formed. After forming the surface layer portion 5b, the actual thickness of the protective layer 5 was measured by sectional observation using a transmission electron microscope (TEM). The thickness of the protective layer 5 was 3.0 nm.

The atomic ratio (N/C) of nitrogen and carbon at an outermost surface of the protective layer 5 was measured by ESCA. The atomic ratio (N/C) was 0.20. The ESCA measurement conditions were as follows.

Figure 2:
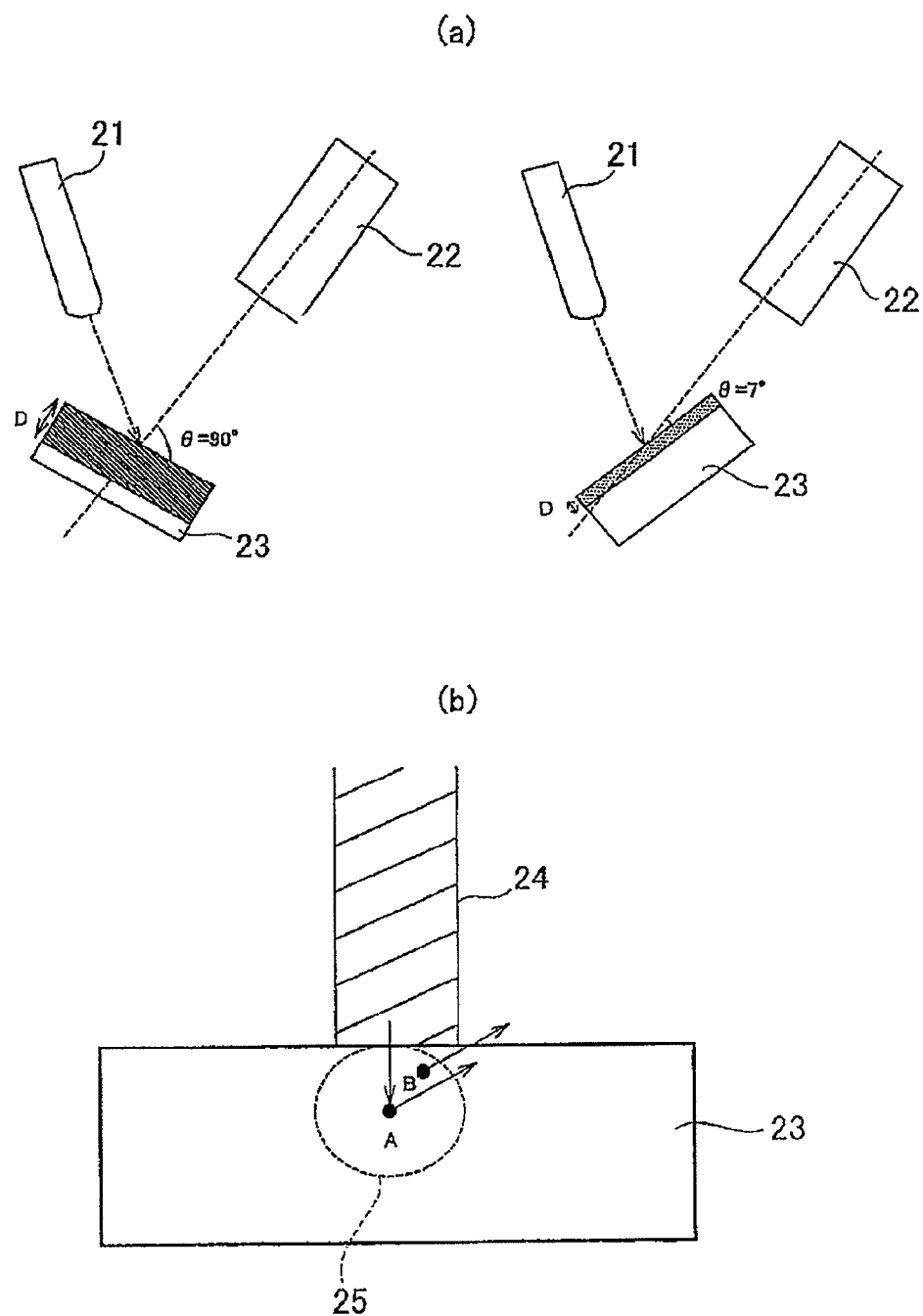
FIG. 2 is diagrams for explaining the X-ray photoelectron spectroscopy.

Apparatus: Quantum2000 manufactured by ULVAC-PHI, Incorporated
X-ray Excitation Source: Al—Kα line (1486.6 eV)
X-ray Source: 20 W
Analysis Chamber Vacuum Degree: <2×10$^{-7}$ Pa
Pass Energy: 117.5 eV
Photoelectron Detection Angle (Exit Angle): 7°
Measurement Object Peak: C1s, N1s
Analysis Region: 100 μmφ
Number of Times: 10 times Herein, the angularly resolved X-ray photoelectron spectroscopy (angularly resolved ESCA) will be explained. FIG. 2 is diagrams for explaining the X-ray photoelectron spectroscopy. FIG. 2(a) is diagrams each showing one example of the configuration of an apparatus for carrying out the X-ray photoelectron spectroscopy, wherein the left and right diagrams each show the positional relationship among an X-ray source 21, a photoelectron detector 22, and a sample 23 when the photoelectron detection angle (exit angle) to a surface of the sample is set to 90° or 7°. FIG. 2(b) is a diagram showing a state where electrons jump out from two points A and B at different depths in the sample 23.

The mean free path λ of an electron in a solid is determined by an energy possessed by the electron. Whether or not an electron (photoelectron) in a sample excited by an X-ray jumps out of the sample depends on not only the depth of its position, but also its exit direction. For example, when an electron proceeds in a perpendicular direction)(θ=90°) from a point A in a region 25 (a region whose depth is smaller than the mean free path λ) excited by an X-ray 24, the electron can jump out of the sample 23. Conversely, when the electron proceeds in an oblique direction (e.g. θ=7°) from the point A, the electron cannot jump out. On the other hand, an electron from a point B closer to a surface than the point A can jump out of the sample not only in the case where it proceeds in the perpendicular direction, but also in the case where it proceeds in an oblique direction (e.g. θ=7°). In this manner, there is a certain relationship between the exit depth D and the exit direction θ (D=λ sin θ). Using this, information in depth directions of a sample is obtained by changing the detection angle of photoelectrons, which is an angularly resolved depth direction analysis. In this invention, photoelectrons are detected by fixing the detection angle. Specifically, by setting the photoelectron detection angle as small as possible (e.g. θ=7°), photoelectrons only from the outermost surface of the protective layer 5 are detected to measure the atomic ratio (N/C) of nitrogen and carbon.

Then, the disk after forming the protective layer 5 was immersed and washed in pure water at 70° C. for 400 seconds and further washed with IPA (isopropyl alcohol) for 400 seconds and then drying was carried out as finish drying by the use of IPA vapor. Then, a lubricating layer 6 made of a PFPE (perfluoropolyether) compound was formed by a dipping method on the protective layer 5 having been subjected to the ultrapure water and IPA cleaning. Specifically, use was made of an alcohol-modified Fomblin Z derivative manufactured by Ausimont Co., Ltd. This compound has 1 to 2 hydroxyl groups at each of both terminals of the PFPE main chain, i.e. 2 to 4 hydroxyl groups as terminal groups per molecule. The thickness of the lubricating layer 6 was 1.4 nm. In the manner described above, a magnetic disk 10 was manufactured.

The surface roughness of the obtained magnetic disk 10 was observed by AFM and it was confirmed to be a smooth surface with Rmax of 3.1 nm and Ra of 0.30 nm. Further, the glide height was measured to be 3.6 nm. For stably setting the flying height of a magnetic head to 10 nm or less, it is desirable that the glide height of a magnetic disk be 4.5 nm or less.

(Evaluation)

Various performances of the obtained magnetic disk 10 were evaluated and analyzed as follows.

(1) LUL Durability Test

An LUL durability test was performed using a 2.5-inch HDD adapted to rotate at 5400 rpm and a magnetic head with a flying height of 10 nm. An NPAB (negative pressure type) slider was used as a slider of the magnetic head and a TMR element was used as a reproducing element. The magnetic disk 10 was mounted in this HDD and the LUL operations were continuously repeated using the magnetic head. The LUL durability was evaluated by measuring the number of LUL times endured with no occurrence of failure of the HDD. The test was performed in an environment of 70° C./80% RH. This condition is more severe than a normal HDD operating environment. This is for more accurately judging the durability/reliability of the magnetic disk by performing the test in the environment assuming HDDs for use in an application such as car navigation.

With the magnetic disk 10 of this Example, the number of LUL times exceeded 1,000,000 times with no failure. Normally, in the LUL durability test, it is required that the number of LUL times exceed 400,000 times continuously with no failure. It is reported that, in the normal HDD using environment, use for about 10 years is necessary for the number of LUL times to exceed 400,000 times. In the LUL durability test, it is further preferable that the number of LUL times exceed 1,000,000 times.

(2) Pin-On-Disk Test

A pin-on-disk test was performed in the following manner. Specifically, in order to evaluate the durability and wear resistance of the protective layer 5, the magnetic disk 10 was rotated while pressing a ball with a diameter of 2 mm made of $Al_2O_3$—TiC against the protective layer 5 at a radius-22 mm position of the magnetic disk 10 at a load of 15 g. By this, the $Al_2O_3$—TiC ball and the protective layer 5 were rotated to slide on each other at a speed of 2 m/sec. Then, the number of sliding times until breakage of the protective layer 5 due to the sliding was measured.

In this pin-on-disk test, if the number of sliding times until breakage of the protective layer 5 is 300 times or more, it is judged successful. Since, normally, a magnetic recording head is not brought into contact with the magnetic disk 10, this pin-on-disk test is a durability test in an environment which is more severe than an actual using environment. With the magnetic disk 10 of Example 1, the number of sliding times was 500 times.

Examples 2 to 6, Comparative Examples 1 to 8

Magnetic disks according to Examples 2 to 6 and Comparative Examples 1 to 8 were manufactured by changing various conditions of Example 1 in the manufacture. Table 1 shows conditions in the manufacture of the magnetic disks according to the respective Examples and Comparative Examples and evaluation results thereof.

TABLE 1

| | Hydrogenated Carbon Protective Film Vaccum Degree (Pa) | Surface Layer Portion Vaccum Degree (Pa) | Substrate Temperature °C. | DC Bias V | Surface Treatment $N_2$ Flow Rate | Surface Treatment RF Bias | Protective Layer Thickness nm | Atomic Weight Ratio (N/C) | Pin-On | LUL Durability Test Number of Enduring Times |
|---|---|---|---|---|---|---|---|---|---|---|
| Example 1 | 1.6 Pa | 6 Pa | 250 | −300 | 250 sccm | 100 W | 3.0 | 0.200 | 500 | 1,000,000 times or more |
| Example 2 | 1 Pa | 2 Pa | 250 | −300 | 250 sccm | 100 W | 3.0 | 0.245 | 450 | 1,000,000 times or more |
| Example 3 | 1 Pa | 6 Pa | 250 | −300 | 250 sccm | 100 W | 3.0 | 0.175 | 640 | 1,000,000 times or more |

TABLE 1-continued

| | Hydrogenated Carbon Protective Film Vaccum Degree (Pa) | Surface Layer Portion Vaccum Degree (Pa) | Substrate Temperature °C. | DC Bias V | Surface Treatment $N_2$ Flow Rate | Surface Treatment RF Bias | Protective Layer Thickness nm | Atomic Weight Ratio (N/C) | Pin-On | LUL Durability Test Number of Enduring Times |
|---|---|---|---|---|---|---|---|---|---|---|
| Example 4 | 2 Pa | 3 Pa | 250 | −300 | 250 sccm | 100 W | 3.0 | 0.248 | 480 | 1,000,000 times or more |
| Example 5 | 0.1 Pa | 3 Pa | 250 | −300 | 250 sccm | 100 W | 3.0 | 0.151 | 740 | 1,000,000 times or more |
| Example 6 | 1 Pa | 3 Pa | 250 | −300 | 250 sccm | 100 W | 3.0 | 0.235 | 575 | 1,000,000 times or more |
| Comparative Example 1 | 3 Pa | 3 Pa | 250 | −300 | 250 sccm | 100 W | 3.0 | 0.252 | 250 | failed at 800,000 times |
| Comparative Example 2 | 0.05 Pa | 3 Pa | 250 | −300 | 250 sccm | 100 W | film formation disabled (film forming rate 0.1 nm/s) | — | — | — |
| Comparative Example 3 | 1 Pa | 1 Pa | 250 | −300 | 250 sccm | 100 W | 3.0 | 0.275 | 55 | failed at 200,000 times |
| Comparative Example 4 | 1 Pa | 7 Pa | 250 | −300 | 250 sccm | 100 W | 3.0 | 0.149 | 750 | failed at 300,000 times |
| Comparative Example 5 | 1 Pa | 3 Pa | 260 | −300 | 250 sccm | 100 W | 3.0 | 0.254 | 240 | failed at 750,000 times |
| Comparative Example 6 | 1 Pa | 1 Pa | 250 | −40 | 250 sccm | 100 W | 3.0 | 0.262 | 185 | failed at 550,000 times |
| Comparative Example 7 | 1 Pa | 1 Pa | 250 | −410 | 250 sccm | 100 W | arcing generated substrate broken | — | — | — |
| Comparative Example 8 | 1 Pa | 3 Pa | 250 | −300 | 250 sccm | 0 W | 3.0 | 0.000 | 980 | failed at 200,000 times |

In Examples 2 to 6, the atomic ratio (N/C) of nitrogen and carbon fell in a range of 0.15 or more and 0.25 or less as in Example 1. As a result, the result of the pin-on-disk test (Pin-On) was successful and the number of LUL times exceeded 1,000,000 times in the LUL durability test.

On the other hand, in Comparative Examples 1, 3 to 6, and 8, the atomic ratio (N/C) of nitrogen and carbon fell outside the range of 0.15 or more and 0.25 or less. As a result, it was not possible to achieve both passing the pin-on-disk test (Pin-On) and exceeding 1,000,000 times of the number of LUL times in the LUL durability test.

In Comparative Example 2, as a result of setting the vacuum degree during formation of a hydrogenated carbon protective film 5a to be as small as 0.05 Pa, the film forming rate of the hydrogenated carbon protective film 5a becomes as extremely slow as 0.1 nm/s so that it was not possible to properly form a protective layer 5. In Comparative Example 7, as a result of setting the magnitude of a substrate bias during formation of a hydrogenated carbon protective film 5a to be as large as −410V, arcing occurred to break a substrate 1.

Figure 3:
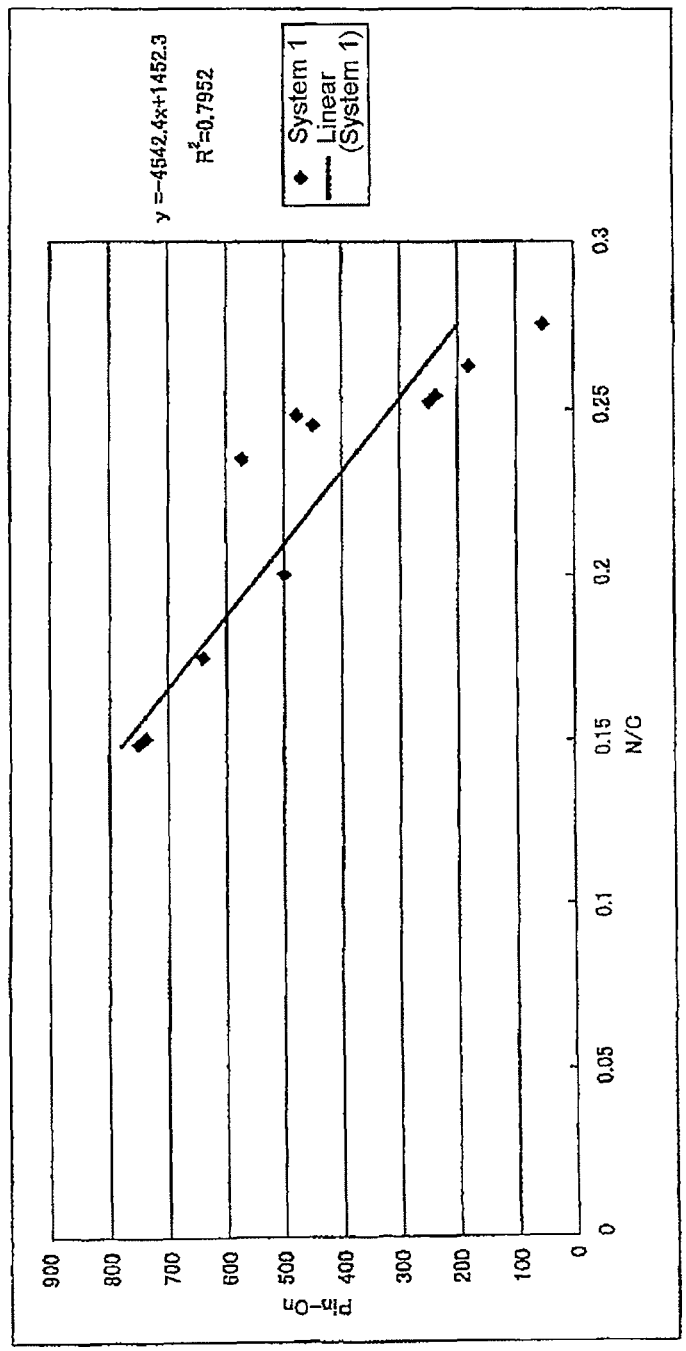
FIG. 3 is a graph showing the relationship between the atomic ratio (N/C) of nitrogen and carbon and the number of sliding times in a pin-on-disk test in Examples and Comparative Examples.

FIG. 3 is a graph showing the relationship between the atomic ratio (N/C) of nitrogen and carbon and the number of sliding times in the pin-on-disk test in the respective Examples and Comparative Examples. Numerical formulas on the right side of the graph show a regression straight line and a determination coefficient ($R^2$) for the regression straight line. As seen from the graph, as the atomic ratio (N/C) decreases, the number of sliding times increases. However, as seen from the results of, for example, Comparative Example 4, if the atomic ratio (N/C) is set too small, the number of LUL times becomes insufficient in the LUL durability test. From these results, it is seen that the atomic ratio (N/C) of nitrogen and carbon is preferably set to 0.15 or more and 0.25 or less.

While this invention has been described with reference to the embodiment, the technical scope of the invention is not limited to the scope of the description of the above-mentioned embodiment. It is obvious to a person skilled in the art that various changes or improvements can be added to the above-mentioned embodiment. It is clear from the description of claims that the modes added with such changes or improvements can also be included in the technical scope of this invention.

INDUSTRIAL APPLICABILITY

This invention is suitably applicable to, for example, a magnetic disk.

The invention claimed is:

1. A magnetic disk manufacturing method of manufacturing the magnetic disk, said magnetic disc comprising:
    a magnetic layer for magnetic recording,
    a protective layer formed over said magnetic layer for protecting said magnetic layer, and
    a lubricating layer formed over said protective layer,
    wherein said protective layer is a layer composed substantially of carbon, hydrogen, and nitrogen and an atomic ratio (N/C) of nitrogen and carbon calculated from intensities of N1s and C1s spectra detected at a photoelectron detection angle of 7° by angularly resolved X-ray photoelectron spectroscopy is 0.15 or more and 0.25 or less,
    wherein said protective layer comprises
    a hydrogenated carbon protective film composed substantially of carbon and hydrogen and formed over said magnetic layer, and
    a surface layer portion containing carbon and nitrogen and formed at a surface portion in contact with said lubricating layer,
    said magnetic disk manufacturing method comprising:
    forming said hydrogenated carbon protective film in an atmosphere with a vacuum degree of 0.1 Pa or more and less than 2 Pa by a plasma CVD method, and forming said surface layer portion in an atmosphere with a vacuum degree of more than 2 Pa and 6 Pa or less by the plasma CVD method.

2. A magnetic disk manufacturing method according to claim 1, further comprising forming said hydrogenated carbon protective film by the plasma CVD method using substantially only a straight-chain saturated hydrocarbon based gas as a reactive gas, but not using a carrier gas.

3. A magnetic disk manufacturing method according to claim 1, further comprising, after forming said hydrogenated carbon protective film, exposing said hydrogenated carbon protective film to a nitrogen atmosphere to perform a surface treatment of said hydrogenated carbon protective film, thereby forming said surface layer portion.

4. A magnetic disk manufacturing method according to claim 3, further comprising performing the surface treatment of said hydrogenated carbon protective film while applying an RF bias at a power of 1 W or more and 100 W or less.

5. A magnetic disk manufacturing method according to claim 1, further comprising, forming said hydrogenated carbon protective film to a thickness of less than 3 nm.

6. A magnetic disk manufacturing method of manufacturing the magnetic disk, said magnetic disc comprising:
a magnetic layer for magnetic recording,
a protective layer formed over said magnetic layer for protecting said magnetic layer, and
a lubricating layer formed over said protective layer,
wherein said protective layer is a layer composed substantially of carbon, hydrogen, and nitrogen and an atomic ratio (N/C) of nitrogen and carbon calculated from intensities of N1s and C1s spectra detected at a photoelectron detection angle of 7° by angularly resolved X-ray photoelectron spectroscopy is 0.15 or more and 0.25 or less,
wherein said protective layer comprises
a hydrogenated carbon protective film composed substantially of carbon and hydrogen and formed over said magnetic layer, and
a surface layer portion containing carbon and nitrogen and formed at a surface portion in contact with said lubricating layer,
said magnetic disk manufacturing method comprising:
forming said surface layer portion in a manner that differs from said protective film by being formed in an atmosphere with a vacuum degree higher than the vacuum degree in which said protective film is formed.

* * * * *